US009398093B2

(12) United States Patent
Yang et al.

(10) Patent No.: US 9,398,093 B2
(45) Date of Patent: Jul. 19, 2016

(54) CONTROL METHOD OF STORAGE APPARATUS

(71) Applicants: Chung-Jen Yang, Taipei (TW);
Yung-Chih Tsao, Taipei (TW);
Shin-Che Feng, Taipei (TW);
Chang-Ching Hung, Taipei (TW);
Chia-Chun Chang, Taipei (TW)

(72) Inventors: Chung-Jen Yang, Taipei (TW);
Yung-Chih Tsao, Taipei (TW);
Shin-Che Feng, Taipei (TW);
Chang-Ching Hung, Taipei (TW);
Chia-Chun Chang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 234 days.

(21) Appl. No.: 13/935,563

(22) Filed: Jul. 5, 2013

(65) Prior Publication Data

US 2014/0013067 A1    Jan. 9, 2014

Related U.S. Application Data

(60) Provisional application No. 61/668,443, filed on Jul. 5, 2012.

(51) Int. Cl.
*G06F 12/00* (2006.01)
*H04L 29/08* (2006.01)
*H04W 4/00* (2009.01)

(52) U.S. Cl.
CPC ............ *H04L 67/1097* (2013.01); *G06F 12/00* (2013.01); *H04W 4/008* (2013.01)

(58) Field of Classification Search
CPC ................................. G06F 3/067; G06F 3/605
See application file for complete search history.

(56) References Cited

FOREIGN PATENT DOCUMENTS

| CN | 202258356 | 5/2012 |
|----|-----------|--------|
| TW | I235325 | 7/2005 |
| TW | 200608300 | 3/2006 |
| TW | 200903264 | 1/2009 |
| TW | M425342 | 3/2012 |

OTHER PUBLICATIONS

Office Action of Taiwan Counterpart Application, issued on Nov. 17, 2014, p. 1-p. 10.

*Primary Examiner* — Brian Peugh
(74) *Attorney, Agent, or Firm* — Jianq Chyun IP Office

(57) ABSTRACT

A control method of a storage apparatus including a control module and a storage element is provided. In the method, the control module provides a first and a second data transmission interface and a control interface, in which the control module respectively establishes data connections with a first and a second electronic device. Then, the control module transmits a first data between the first electronic device and the storage element via the first data transmission interface. In transmitting the first data between the first electronic device and the storage element via the first data transmission interface by the control module, when receiving a transmission request for a second data in the storage element from the second data transmission interface, the control module provides the second data transmission interface for transmitting the second data after the transmission of the first data has been completed.

16 Claims, 8 Drawing Sheets

CONTROL METHOD OF STORAGE APPARATUS

CROSS-REFERENCE TO RELATED APPLICATION

This application claims the priority benefits of U.S. provisional application Ser. No. 61/668,443, filed on Jul. 5, 2012. The entirety of the above-mentioned patent applications is hereby incorporated by reference herein and made a part of this specification.

BACKGROUND OF THE INVENTION

1. Field of the Invention

The present invention generally relates to a data transmission method, and in particular, to a control method of a storage apparatus providing different devices to access data concurrently.

2. Description of Related Art

Presently, mobile devices such as smart phones and tablet computers have become more prevalent. Such devices may not only provide versatile functionalities such as voice communication, text messaging, e-mail transmission, or web browsing by installing applications, but also provide photo shooting and video recording by using built-in cameras, which allow a user to record moments of daily life anytime and anywhere. Such devices may also serve as mini multimedia players providing the user to record, play, and share multimedia files such as photos and videos for entertainment purposes.

Flash memories with smaller sizes and less power consumption are used by the mobile devices as recording media of programs and files for portability and durability. Compared to the large storage capacity of conventional hard drives, the storage capacity of such memories may be relatively limited and expensive. Hence, memories with large storage capacity may not be configured in conventional mobile devices due to cost issues.

As the user install or store more applications and multimedia files in the devices, the limited storage space in the mobile devices may be insufficient. Hence, a wireless hard drive has been introduced on the market. It may not only provide a wired data connection and large storage capacity similar to a conventional mobile hard drive, but also include a wireless transmission feature, which may allow the mobile device to establish a wireless data connection for data transmission and expand the usable storage space for the mobile device accordingly.

However, the existing wireless hard drives may only perform data transmission by either a wireless connection approach or a wireless connection approach. When the user connects an external device to the wireless hard drive via a physical circuit such as a universal serial bus (USB), the wireless hard drive may establish a wired data connection with the external device for data transmission. When the user unplugs the external device from the wireless hard drive, the wireless hard drive may turn on a wireless transmission module to provide other devices to establish wireless data connections with it for data transmission. Hence, the wireless hard drive may only provide data access for one of the devices at one time. Once the hard drive is connected to and accessed by one of the devices, it may not be accessed by the other devices, and therefore the applicable range of the wireless hard drive is limited.

SUMMARY OF THE INVENTION

Accordingly, the present invention is directed to a control method of a storage apparatus, through which different devices can access data of a storage device concurrently.

The present invention is directed to a control method of a storage apparatus including a control module and a storage element. In the method, the control module provides a first data transmission interface, a second data transmission interface, and a control interface, in which the control module respectively establishes data connections with a first electronic device and a second electronic device. Then, the control module transmits a first data between the first electronic device and the storage element via the first data transmission interface. In the process of the control module transmitting the first data between the first electronic device and the storage element via the first data transmission interface, the control module provides the second data transmission interface for transmitting a second data after a transmission of the first data has been completed when receiving a transmission request for the second data in the storage element from the second data transmission interface.

To sum up, in the control method of the storage apparatus of the present invention, two data transmission interfaces are provided by a control module to connect two electronic devices respectively and a control interface is configured between the data transmission interfaces and a storage element to provide the two electronic devices to concurrently access a data in the storage element so that the data in the storage apparatus may be accessed by the different devices concurrently.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
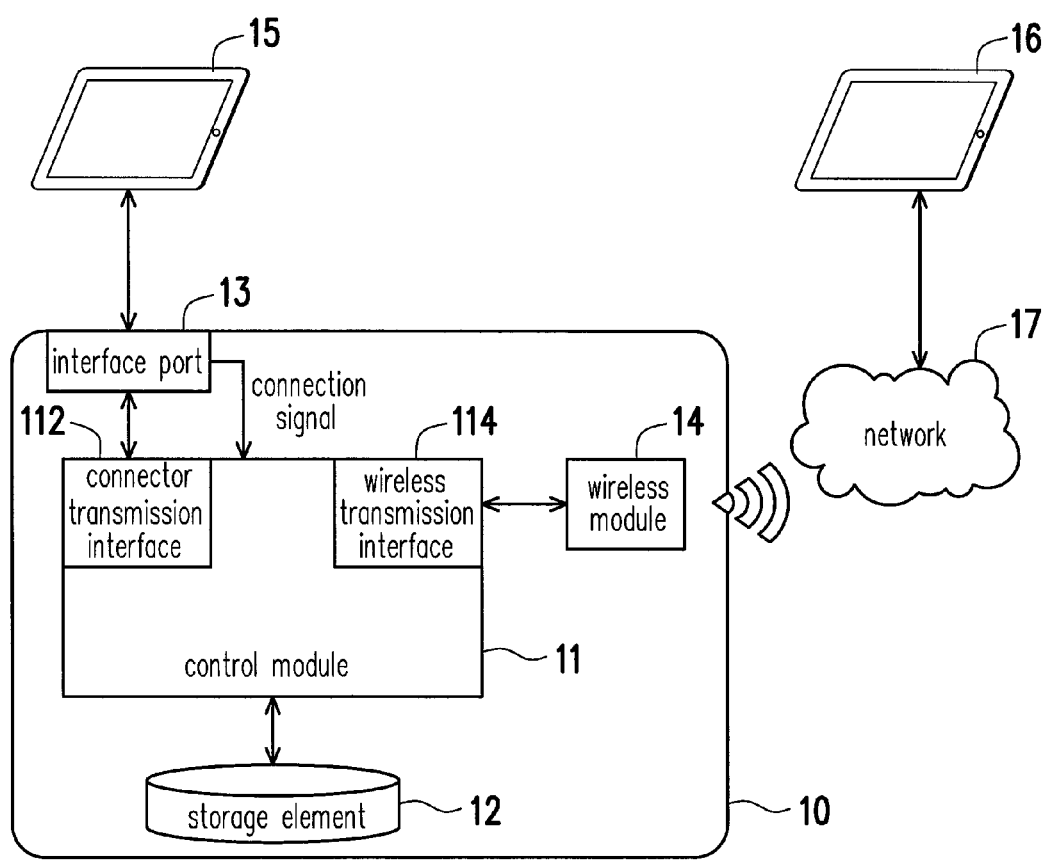
FIG. 1 is a schematic diagram of a storage apparatus providing electronic devices with data access according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

In the present invention, an existing controller such as Silicon on a Chip (SoC) supporting a wireless communication module (e.g. a wireless module) and each type of a peripheral connection interface (e.g. a USB 2.0 interface) may be configured in a storage apparatus so as to manage each access to the storage apparatus from peripheral electronic devices. When the control module receives read requests for data in the storage apparatus from two transmission interfaces simultaneously, the control module may concurrently process the two read requests and perform data transmission on electronic devices connected by the two transmission interfaces by using the wireless communication module and the peripheral connection interface. When the control module receives write requests for the data in the storage apparatus from the two transmission interfaces simultaneously, according to the data transmission progress, the control module may transmit the data via one of the transmission interfaces. Once the transmission of last data is completed, the control module may transmit the data via the other transmission interface. Thus, different electronic devices may be allowed to concurrently access data in the storage apparatus while the data integrity is ensured.

FIG. 1 is a schematic diagram of a storage apparatus providing electronic devices with data access according to an embodiment of the present invention. Referring to FIG. 1, a storage apparatus 10 in the present embodiment includes a control module 11, a storage element 12, an interface port 13, and a wireless module 14. The control module 11 may be an integrated chip including a connector transmission interface 112 and a wireless transmission interface 114. The control module 11 may process data received by the connector transmission interface 112 and the wireless interface 14 concurrently. The wireless module 14 may be a Wireless Fidelity (Wi-Fi) module, a Worldwide Interoperability for Microwave Access (Wi-Max) module, a third-generation (3G) module, an infrared module, or a Bluetooth module based on the design of a product, and yet the present invention is not limited thereto. The interface port 13 may be a USB connector or a mini USB connector. The storage apparatus 10 may provide a connector access mode and a wireless access mode so that an external first electronic device 15 and an external second electronic device 16 may access data in the storage element 12 concurrently.

The storage apparatus 10 may detect a connection of the external first electronic device 15 and correspondingly sends a connection signal to the control module 11 via, for example, a detection pin on the interface port 13. The control module 11 may provide the connector transmission interface 112 so as to connect to the first electronic device 15 and transmit the data with the first electronic device 15 via the interface port 13. On the other hand, the control module 11 may further provide the wireless transmission interface 114 so as to connect to a network 17 via the wireless module 14 as well as receive a connection from the second electronic device 16 via the network 17 and transmit the data with the second electronic device 16. In general, the storage apparatus 10 may receive the connection from the second electronic device 16 via the network 17 so as to allow the second electronic device 16 to transmit data with the storage apparatus 10. Based on the design of the product, the storage apparatus 10 may receive the connection directly from the second electronic device 16 without the network 17 and allow the second electronic device 16 to transmit the data with the storage apparatus 10 directly, and yet the present invention is not limited thereto. While the first electronic device 15 and the second electronic device 16 are concurrently performing data writing procedures on the storage element 12, according to the data transmission progress, the control module 11 may, for example, transmit the data via one of the transmission interfaces. Once the transmission is completed, the control module 11 may transmit the data via the other transmission interface. Thus, the storage apparatus 10 may allow the user to use the first electronic device 15 and the second electronic device 16 to read and write a same data in the storage element 12. The storage apparatus 10 may also provide the first electronic device 15 and the second electronic device 16 to write and read different data in a same drive of the storage element 12.

The First Embodiment

Figure 2:
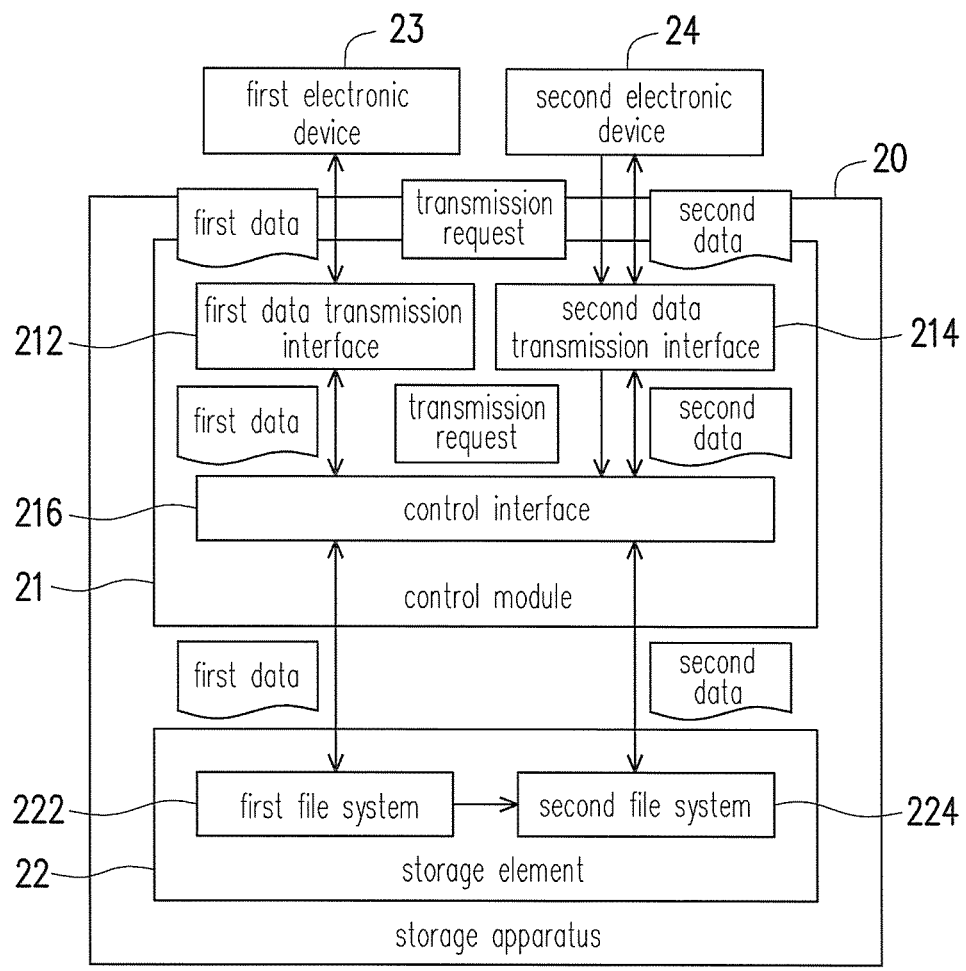
FIG. 2 is a schematic diagram of a storage apparatus according to the first embodiment of the present invention.

FIG. 2 is a schematic diagram of a storage apparatus according to the first embodiment of the present invention. Referring to FIG. 2, a storage apparatus 20 in the present embodiment includes a control module 21 and a storage element 22. The storage apparatus 20 may provide an external first electronic device 23 and an external second electronic device 24 to access data in the storage element 22 concurrently. The functionalities of the control module 21 and the storage element 22 are described as follows.

The control module 21 may be, for example, a SoC and is connected to the storage element 22. The control module 21 may provide a first data transmission interface 212 and use the same to establish a data connection with the first electronic device 23, provide a second data transmission interface 214 and use the same to establish a connection with the second electronic device 24, and provide a control interface 216 and use the same to provide the first data transmission interface 212 and the second data transmission interface 214 to perform data transmission with the storage element 22 concurrently. The first data transmission interface 212, the second data transmission interface 214, and the control interface 216 may be, for example, hardware devices composed by logic circuit elements for data transmission. Such interfaces may also be programs loaded from the storage element 22 and executed by the control module 21 for data transmission.

The first data transmission interface 212 and the second data transmission interface 214 may be, for example, two wired data transmission interfaces, two wireless data transmission interfaces, or one wired data transmission interface and one wireless data transmission interface. The wired data transmission interface may be a USB interface, a FireWire interface, or a Thunderbolt interface. The wireless data transmission interface may be an interface supporting Wireless Fidelity (Wi-Fi), Global System for Mobile Communication (GSM), Personal Handy-phone System (PHS), Code Division Multiple Access (CDMA), Worldwide Interoperability for Microwave Access (WiMAX), infrared, or Bluetooth.

In one embodiment, the first data transmission interface 212 may be, for example, a connector driver built in the control module 21 for providing the first electronic device 23 to establish a data connection with the storage apparatus 20 via a connector interface. The second data transmission interface 214 may be, for example, a remote service engine built in the control module 21 for providing the second electronic device 24 to establish a data connection with the storage apparatus 20 via a wireless interface such as WiFi.

The storage element 22 may be a fixed or removable random access memory (RAM), Read-Only Memory (ROM), flash memory, hard drive, memory card, other similar devices or a combination of such devices for data storage. A first file system 222 adapted for the first data transmission interface 212 and a second file system 224 adapted for the second data transmission interface 214 are included in the storage element 22. The second file system 224 is configured to record data in a local folder of the storage element 22 while the first file system 222 is configured to record image files of the data in the local folder.

Figure 3:
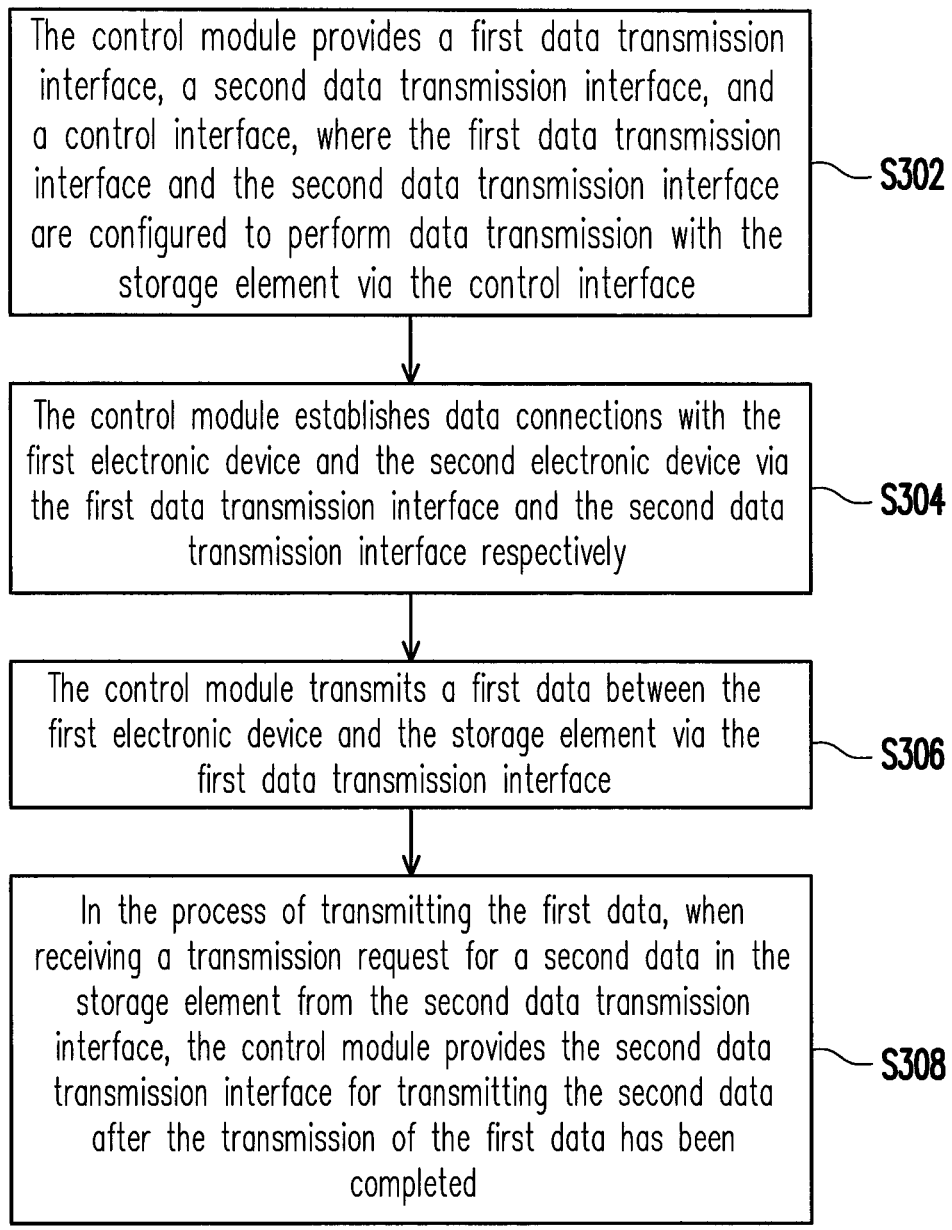
FIG. 3 is a flow chart of a control method of the storage apparatus according to the first embodiment of the present invention.

FIG. 3 is a flow chart of a control method of the storage apparatus according to the first embodiment of the present invention. Referring to both FIG. 2 and FIG. 3, the approach in the present embodiment is adapted for the storage apparatus 20 in FIG. 2. The detailed steps of the control method in the present embodiment will be illustrated along with each of the components of the storage apparatus 20 in FIG. 2.

First, the first data transmission interface 212, the second data transmission interface 214, and the control interface 216 are provided by the control module 21 (Step S302). The first data transmission interface 212 and the second data transmission interface 214 are configured to perform data transmission with the storage element 22 via the control interface 216.

Next, the control module 21 establishes data connections with the first electronic device 23 and the second electronic device 24 via the first data transmission interface 212 and the second data transmission interface 214 respectively (Step S304). In the present embodiment, the control module 21 executes a connector driver and a remote service engine and further provides the data connections to the first electronic device 23 and the second electronic device 24 via a wired or a wireless approach. However, in other embodiments, the control module 21 may execute two connector drivers and further provide the data connections to the first electronic device 23 and the second electronic device 24 via a wired approach. Alternatively, the control module 21 may execute two remote service engines and further provide the data connections to the first electronic device 23 and the second electronic device 24 via a wireless approach. The present invention is not limited herein.

Next, the control module 21 may transmit a first data between the first electronic device 23 and the storage element 22 via the first data transmission interface 212 (Step S306). The first electronic device 23 may be instructed by, for example, the control interface 216 of the control module 21 to access the first data in the first file system 222. Since the data stored in the first file system 222 is the image files of the data in the local folder of the storage element 22, the data obtained from the first file system 222 by the first electronic device 23 is identical to the data recorded in the local folder of the second file system 224.

It is noted that, in the process of transmitting the first data, when receiving a transmission request for a second data in the storage element 22 from the second data transmission interface 214, the control module 21 may, for example, provide the second data transmission interface 214 for transmitting the second data after the transmission of the first data has been completed (Step S308). The second data may be, for example, the same as or different from the first data. The present invention is not limited herein.

Figure 4:
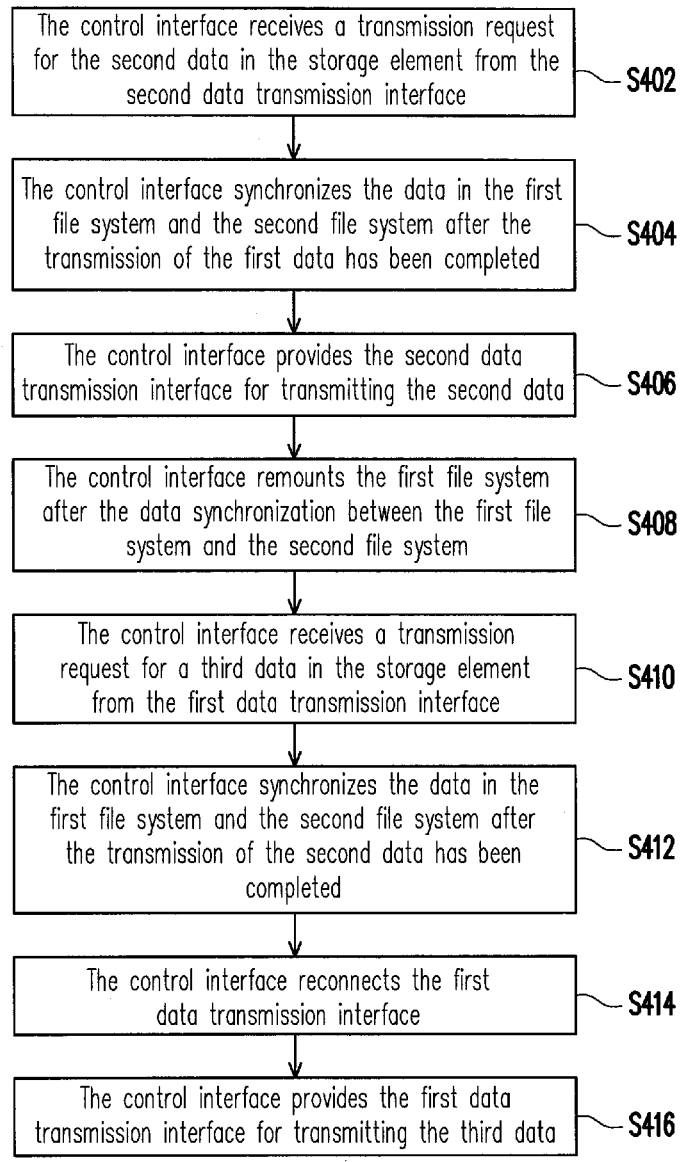
FIG. 4 is a flow chart of a control method of the storage apparatus according to the first embodiment of the present invention.

To be more specific, FIG. 4 is a flow chart of a control method of the storage apparatus according to the first embodiment of the present invention. Referring to both FIG. 2 and FIG. 4, while the first electronic device 23 and the storage element 22 are transmitting the first data, if the second electronic device 24 wishes to transmit the second data with the storage element 22, the second electronic device 24 may send a transmission request for the second data to the second data transmission interface 214. The control interface 216 may also receive the transmission request for the second data in the storage element 22 from the second data transmission interface 214 (Step S402).

Meanwhile, to prevent data corruption or data loss due to a discontinuity during the data transmission between the first electronic device 23 and the storage element 22, the control interface 216 may, for example, temporarily stop executing the transmission request for the second data, wait for the completion of the transmission of the first data, and synchronize the data in the first file system 222 and the second file system 224 after the transmission of the first data has been completed so that the data in the second file system and the data in the first file system upon the completion of the data transmission is identical (Step S404). Next, the control interface 216 may provide the second data transmission interface 214 for transmitting the second data (step S406).

After the transmission of the second data via the second data transmission interface 214 is completed, to allow the user of the first electronic device 23 to see the data in the updated second file system 224, the control module 216 may, for example, remount the first file system 224 after the data synchronization between the first file system 222 and the second file system 224 (Step S408). Hence, the first electronic device 24 may access the synchronized data in the second file system 224 via the first data transmission interface 212.

Similarly, while the second electronic device 24 and the storage element 22 are transmitting the second data, if the control interface 216 receives a transmission request for a third data in the storage element 22 from the first data transmission interface 212 (Step S410), the control interface 216 may, for example, stop executing the transmission request for the third data, wait for the completion of the transmission of the second data, and synchronize the data in the first file system 222 and the second file system 224 after the transmission of the second data has been completed (Step S412).

After the data synchronization between the first file system 222 and the second file system 224, the control interface 216 may, for example, reconnect the first data transmission interface 212 (Step S414) so that the first electronic device 23 may access the synchronized data in the first file system 222 via the first data transmission interface 212. Lastly, the control interface 216 may provide the first data transmission interface 212 for transmitting the third data (Step S416).

Through the aforementioned control method, two electronic devices may be allowed to access data in a storage apparatus concurrently while the data integrity is ensured.

It is noted that, to prevent data corruption or data loss due to writing operations on a same data in the storage element 22 performed by the first electronic device 23 and the second electronic device 24 concurrently, the control interface 216 may, for example, set a semaphore in the control module 21 to record the usage status of the storage element 22 and determine, accordingly, whether to provide the first data transmission interface 212 or the second data transmission interface 214 to write in data.

To be more specific, when receiving a data write-in request from the first data transmission interface 212 or the second data transmission interface 214, the control interface 216 may, for example, check if the semaphore in the control module 21 is locked. If the semaphore is locked, it represents that one of the data transmission interfaces is performing a data write-in operation on the storage element 22, and the control interface 216 may stop executing the data write-in request. By contrast, if the semaphore is not locked, it represents that none of the data transmission interfaces is performing the data write-in operation on the storage element 22, and the control interface 216 may execute the data write-in request immediately.

While executing the data write-in request, the control interface 216 may also lock the semaphore so as to prohibit another data transmission interface writing data into the storage element 22. After the writing of the last data of the write-in request is completed, the control interface 216 may unlock the semaphore and provide a next data transmission interface for data write-in. In one embodiment, while the control interface 216 stops executing the data write-in request, it may further, for example, accumulate a waiting time until the completion of the transmission of the last data during the data write-in request. If the waiting time exceeds a predetermined time, the control interface 216 may reject the current data write-in request to prevent an electronic device from adversely affecting other operations due to the long waiting time for the data write-in request.

The Second Embodiment

Figure 5:
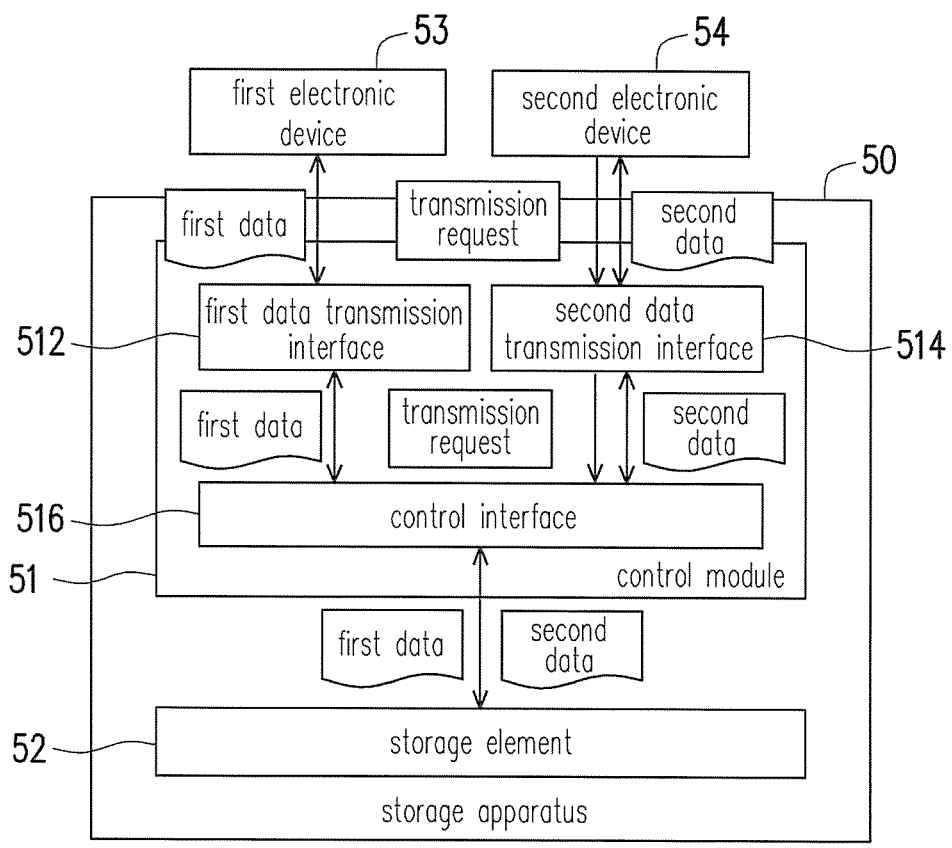
FIG. 5 is a schematic diagram of a storage apparatus according to the second embodiment of the present invention.

FIG. 5 is a schematic diagram of a storage apparatus according to the second embodiment of the present invention. Referring to FIG. 5, a storage apparatus 50 in the present invention includes a control module 51 and a storage element 52. The storage apparatus 50 may provide an external first electronic device 53 and an external second electronic device 54 to access data in the storage element 52. The functionalities of the control module 51 and the storage element 52 are described as follows.

The control module 51 may be, for example, a Soc and is connected to the storage element 52. The control 51 may provide a first data transmission interface 512 and use the same to establish a data connection with the first electronic device 53, provide a second data transmission interface 514 and use the same to establish a connection with the second electronic device 54, and provide a control interface 516 and use the same to provide the first data transmission interface 512 and the second data transmission interface 514 to perform data transmission with the storage element 52.

The storage element 52 may be a fixed or removable RAM, ROM, flash memory, hard drive, memory card, other similar devices, or a combination of such devices for data storage. To distinguish from the first embodiment, the storage element 52 in the present embodiment is a block device using a single file system. The control interface 516 may, for example, mount the data in the storage element 52 onto a target folder on one of the first data transmission interface 512 and the second data transmission interface 514, create a backing storage equivalent to the data of the storage element 52 for the other data transmission interface, and store the backing storage in a temporary storage area of the connected electronic device.

Moreover, a concurrent access control mechanism in the present embodiment is managed by a kernel of an operating system executed by the control module 51, while the control interface 516 is responsible for reflashing data contents on the first data transmission interface 512 or the second data transmission interface 514 by reconnecting thereto in a proper time and manner.

For example, it is assumed that the data content at a connector terminal (corresponding to the first electronic device 53) is the content in the block device opened by a connector driver (corresponding to the first data transmission interface 512), and the content at a remote terminal (corresponding to the second electronic device 54) updated by a remote service engine may not be reflected to the connector terminal immediately. Hence, the block device has to be retriggered by the connector driver so that the latest data content may be reflected to the first electronic device 53 connected to the connector terminal. The updated content in the block device may be reloaded by the connector driver through reconnecting the connector.

Figure 6:
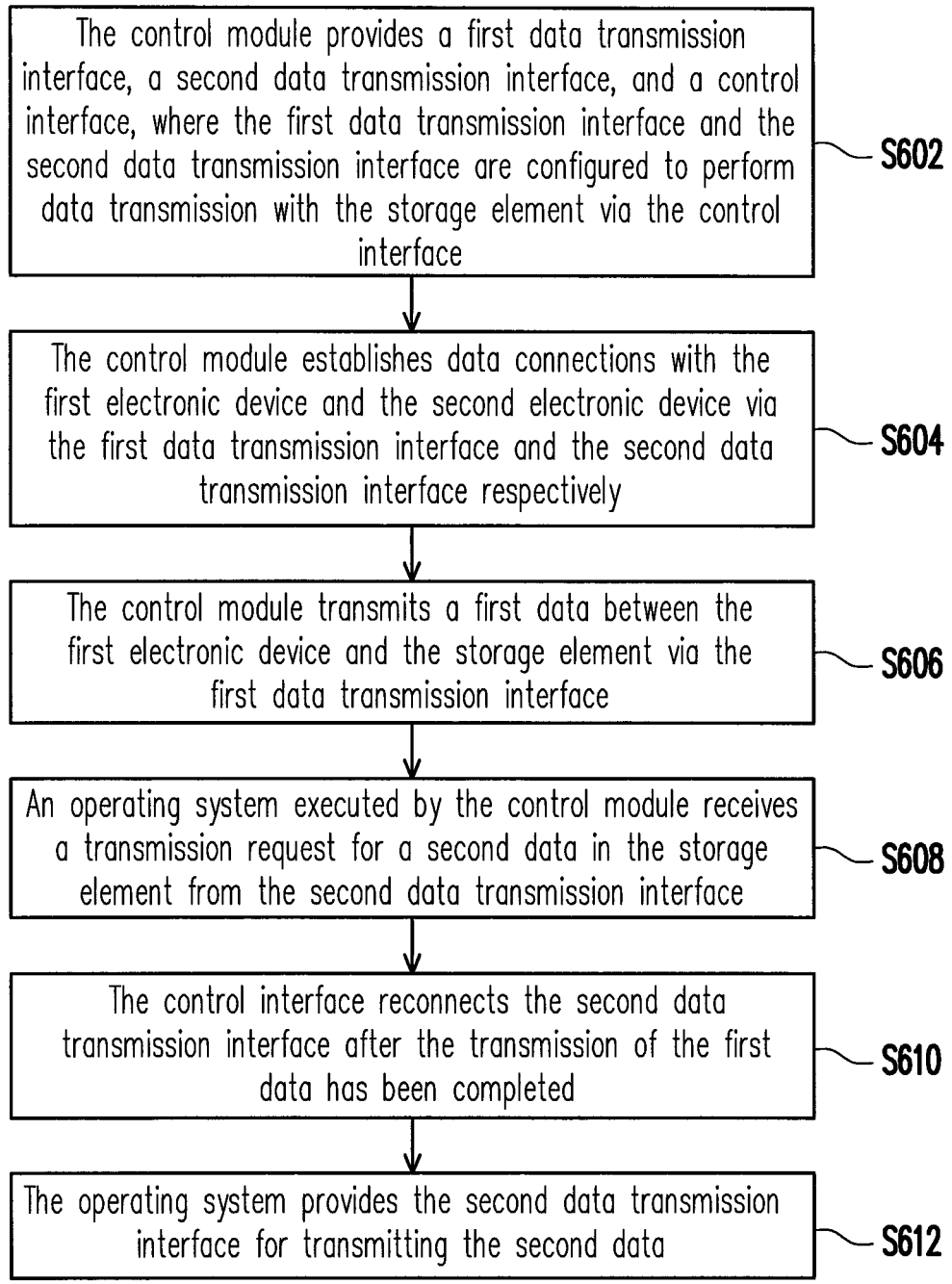
FIG. 6 is a flow chart of a control method of the storage apparatus according to the second embodiment of the present invention.

To be more specific, FIG. 6 is a flow chart of a control method of the storage apparatus according to the second embodiment of the present invention. Referring to both FIG. 5 and FIG. 6, the approach in the present embodiment is adapted for the storage apparatus 50 in FIG. 5. The detailed steps of the control method in the present embodiment will be illustrated along with each of the components of the storage apparatus 50 in FIG. 5.

First, the control module 51 provides the first data transmission interface 512, the second data transmission interface 514, and the control interface 516 (Step S602). The first data transmission interface 512 and the second data transmission interface 514 are configured to perform data transmission with the storage element 52 via the control interface 516. Next, the control module 51 establishes data connections with the first electronic device 53 and the second electronic device 54 via the first data transmission interface 512 and the second data transmission interface 514 respectively (Step S604).

Next, the control module 51 may transmit a first data between the first electronic device 53 and the storage element 52 via the first data transmission interface 512 (Step S606). In the process of transmitting the first data, when receiving a transmission request for a second data in the storage element 52 from the second data transmission interface 514 (Step S608), the control module 51 may stop executing the transmission request for the second data, wait for the completion of the transmission of the first data, and the control interface 516 may reconnect the second data transmission interface 516 after the transmission of the first data has been completed (Step S610). Thus, the second electronic device may access the first data via the second data transmission interface 514 after the file transmission is completed. Finally, the operating system may provide the second data transmission interface 514 for transmitting the second data (Step S612).

It is noted that, while one of the first electronic device 53 and the second electronic device 54 is performing a writing operation on a data in the storage element 52, the other electronic device may not be able to open the same data or the content of the opened data has been modified. To prevent such conditions, when receiving an open request for a third data in the storage element 52 from the first data transmission interface 512 or the second data transmission interface 514, the control module 51 may, for example, transmit the third data to the first data transmission interface 512 or the second data transmission interface 514, and store the third data modified by the first data transmission interface 512 or the second data transmission interface 514 into a temporary storage area in the corresponding electronic device. When receiving a storage request for the third data from the first data transmission interface 512 or the second data transmission interface 514, the control module 51 may write the third data stored in the temporary storage area back to the storage element 52.

On the other hand, when receiving open requests for the third data in the storage element 52 from the first data transmission interface 512 and the second data transmission interface simultaneously, the control module 51 may transmit the third data to the first data transmission interface 512 and the second data transmission interface 514, and store the third data modified by the first data transmission interface 512 and the second data transmission interface 514 into temporary storage areas in the corresponding electronic devices respectively. When receiving storage requests for the third data from the first data transmission interface 512 and the second data transmission interface 514, the control module 51 may write the third data stored in the temporary storage areas into the storage element 52 according to an order of receiving the storage requests. The third data corresponding to the latter received storage request may overwrite the third data corresponding to the former received storage request.

Through the aforementioned control method, a storage apparatus may provide the user to open and edit a same data in the storage apparatus from different electronic devices and preserve the latest stored version of the data according to an order of storing the data on the electronic devices by the user so as to update the data to its latest version.

The Third Embodiment

Figure 7:
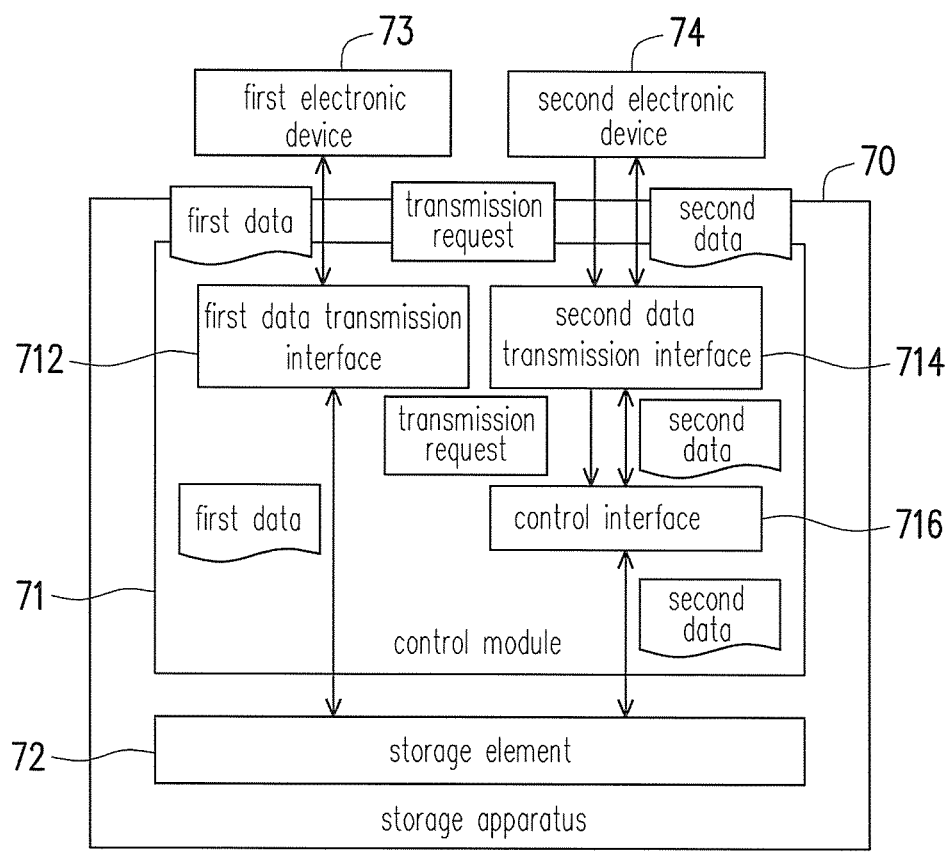
FIG. 7 is a schematic diagram of a storage apparatus according to the third embodiment of the present invention.

FIG. 7 is a schematic diagram of a storage apparatus according to the third embodiment of the present invention. Referring to FIG. 7, a storage apparatus 70 in the present embodiment includes a control module 71 and a storage element 72. The storage apparatus 70 may provide an external first electronic device 73 and an external second electronic device 74 to access data in the storage element 72. The functionalities of the control module 71 and the storage element 72 are described as follows.

The control module 71 may be, for example, a SoC and is connected to the storage element 72. The control 71 may provide a first data transmission interface 712 and use the same to establish a data connection with the first electronic device 73, provide a second data transmission interface 714 and use the same to establish a connection with the second electronic device 74, and provide a control interface 716. To distinguish from the aforementioned embodiments, the control interface provided by the control module 71 in the present embodiment may only provide the second data transmission interface 714 and the storage element 72 for data transmission. In other words, the first data transmission interface 712 may perform data transmission with the storage element 72 directly.

The storage element 72 may be a fixed or removable RAM, ROM, flash memory, hard drive, memory card, other similar devices or a combination of such devices for data storage. Same as the second embodiment, the storage element 72 in the present embodiment employs a block device using a single file system. However, distinguishing from the second embodiment, an access path of the first data transmission interface 712 is assigned to the storage element 72 so as to allow the first electronic device 73 to access the data from the storage element 72 directly, and therefore the first electronic device 73 may not need to temporarily store the opened data. In terms of the second data transmission interface 514, the control interface 516 may mount the data in the storage element 72 onto a target folder on the second data transmission interface 514 so that the data can be accessed by the second data transmission interface 514.

Similar to the second embodiment, a concurrent access control mechanism in the present embodiment is managed by a kernel of an operating system executed by the control module 71, while the control interface 716 is responsible for reflashing file contents on the first data transmission interface 712 by reconnecting thereto in a proper time and manner.

Figure 8:
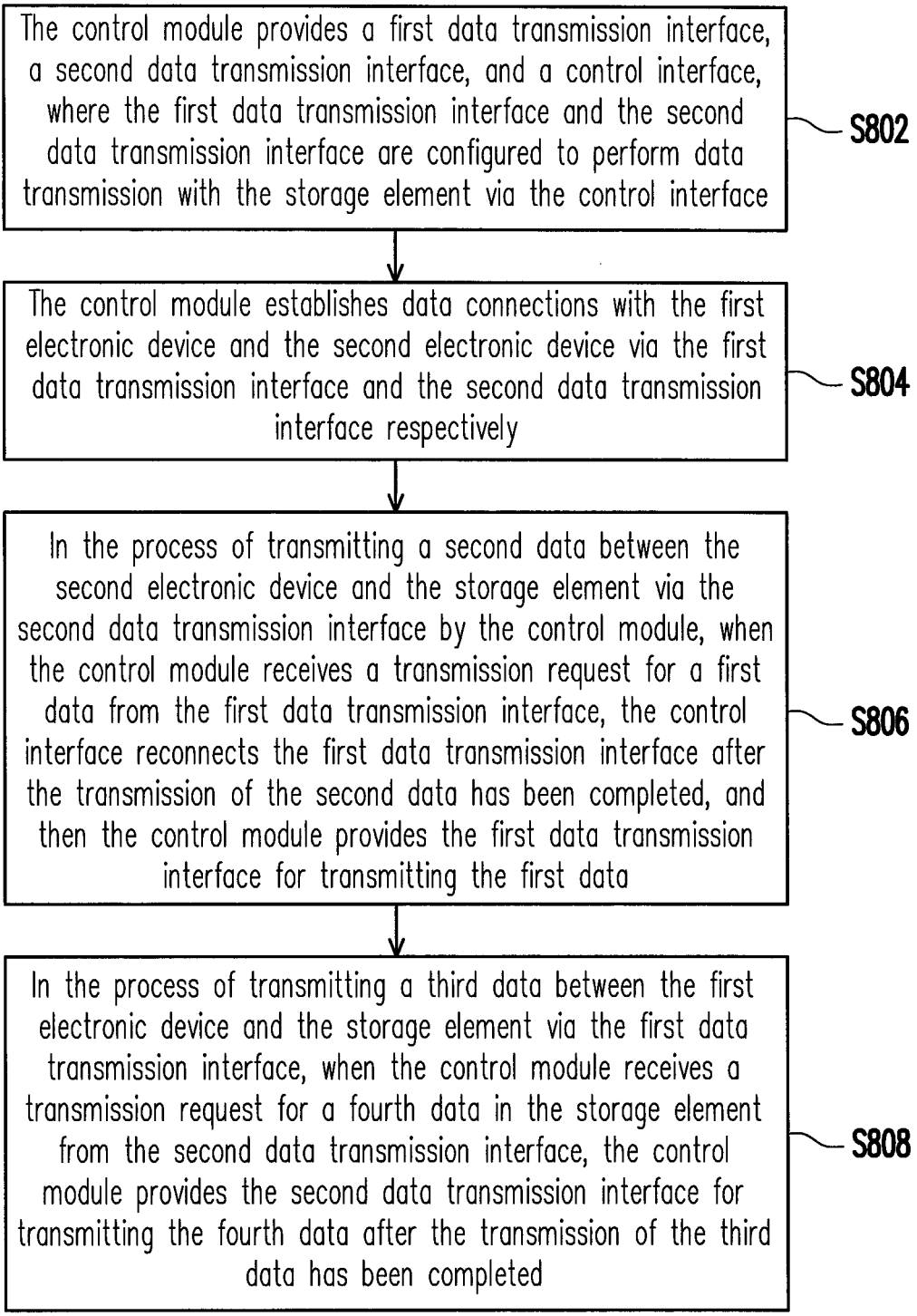
FIG. 8 is a flow chart of a control method of the storage apparatus according to the second embodiment of the present invention.

To be more specific, FIG. 8 is a flow chart of a control method of the storage apparatus according to the second embodiment of the present invention. Referring to both FIG. 7 and FIG. 8, the approach in the present embodiment is adapted for the storage apparatus 70 in FIG. 7. The detailed steps of the control method in the present embodiment will be illustrated along with each of the components of the storage apparatus 70 in FIG. 7.

First, the control module 71 provides the first data transmission interface 712, the second data transmission interface 714, and the control interface 716 (Step S802). The first data transmission interface 712 and the second data transmission interface 714 are configured to perform data transmission with the storage element 72 via the control interface 716. Next, the control module 71 establishes data connections with the first electronic device 73 and the second electronic device 74 via the first data transmission interface 712 and the second data transmission interface 714 respectively (Step S804).

Next, in the process of transmitting a second data between the second electronic device 74 and the storage element 72 via the second data transmission interface 714 by the control module 71, when an operating system executed by the control module 71 receives a transmission request for a first data from the first data transmission interface 712, the control module 71 may wait for the completion of the transmission of the second data, and the control interface 716 may reconnect the first data transmission interface 712 after the transmission of the second data has been completed so that the first electronic device 73 may access the second data via the first data transmission interface 712. Finally, the operating system may provide the first data transmission interface 712 for transmitting the first data (Step S806). The second data may be, for example, the same as or different from the first data. The present invention is not limited herein.

On the other hand, in the process of transmitting a third data between the first electronic device 73 and the storage element 72 via the first data transmission interface 712, when the operating system executed by the control module 71 receives a transmission request for a fourth file in the storage element 72 from the second data transmission interface 714, the control module 71 may wait for the completion of the transmission of the third data, and the operating system may provide the second data transmission interface 714 for transmitting the fourth file after the transmission of the third data has been completed (Step S808). The fourth file may be, for example, the same as or different from the third data. The present invention is not limited herein.

It is noted that, similar to the aforementioned first and second embodiments, the control interface 716 in the present embodiment may, for example, set a semaphore in the control module 71 to record the usage status of the storage element 72 and determine, accordingly, whether to provide the first data transmission interface 712 or the second data transmission interface 714 to write data. Moreover, when the control interface 716 stops executing the data write-in request, it may further, for example, accumulate a waiting time until the completion of the last data transmission during the data write-in request. If the waiting time exceeds a predetermined time, the control interface 716 may reject the current data write-in request to prevent an electronic device from adversely affecting other operations due to the long waiting time for the data write-in request.

Through the aforementioned control method, a storage apparatus may also provide the user to open and edit a same data in a storage apparatus from different electronic devices and only preserve the latest stored version of the data so as to update the data to its latest version.

To sum up, by using two data transmission interfaces provided by a control module to connect to different electronic devices respectively and by using a control interface between the data transmission interfaces and a storage element, the control method of the storage apparatus in the present invention may perform access operations by the different electronic devices on a data in a storage element. When receiving transmission requests from the two data transmission interfaces simultaneously, data may be transmitted by one of the data transmission interfaces according to the data transmission progress. Upon the completion of the transmission, a file system may be remounted or reconnected to the data transmission interfaces after data synchronization so that the data in the storage apparatus may be concurrently accessed by different apparatuses.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control method of a storage apparatus comprising a control module and a storage element, comprising:
    providing a first data transmission interface, a second data transmission interface, and a control interface by the control module, wherein the control module establishes data connections with a first electronic device and a second electronic device via the first data transmission interface and the second data transmission interface respectively, and wherein the first data transmission interface and the second data transmission interface establish data connections with the storage element via the control interface;
    transmitting a first data between the first electronic device and the storage element via the first data transmission interface by the control module; and
    in the process of transmitting the first data between the first electronic device and the storage element via the first data transmission interface by the control module, when receiving a transmission request for the second data in the storage element from the second data transmission interface by the control module, transmitting a second data between the second electronic device and the storage element via the second data transmission interface after a transmission of the first data has been completed.

2. The control method of the storage apparatus according to claim 1, wherein while waiting for a completion of the transmission of the first data, the method further comprises:
    rejecting the transmission request for the second data by the control interface when a waiting time for transmitting the first data exceeds a predetermined time.

3. The control method of the storage apparatus according to claim 1, wherein the storage element comprises a first file system adapted for the first data transmission interface and a second file system adapted for the second data transmission interface.

4. The control method of the storage apparatus according to claim 3, wherein one of the first file system and the second file system is configured to record data in a local folder of the storage element, and wherein the other one of the first file system and the second file system is configured to record an image file of the data in the local folder.

5. The control method of the storage apparatus according to claim 3, wherein the steps of when receiving the transmission request for the second data in the storage element from the second data transmission interface by the control module, transmitting the second data between the second electronic device and the storage element via the second data transmission interface after the transmission of the first data has been completed comprise:
    receiving the transmission request for the second data in the storage element from the second data transmission interface by the control interface;
    synchronizing data in the first file system and the second file system by the control interface after the transmission of the first data has been completed; and
    transmitting the second data between the second electronic device and the storage element by the control interface when the synchronization between the first file system and the second file system is completed.

6. The control method of the storage apparatus in claim 5, wherein after the step of synchronizing the data in the first file system and the second file system by the control interface, the method further comprises:
    reconnecting to the first data transmission interface or remounting the first file system by the control interface to enable the second electronic device to access the synchronized data in the second file system via the second data transmission interface.

7. The control method of the storage apparatus in claim 1, wherein the storage element is a block device using a virtual file system.

8. The control method of the storage apparatus in claim 7, wherein the steps of when receiving the transmission request for the second data in the storage element from the second data transmission interface by the control module, transmitting the second data between the second electronic device and the storage element via the second data transmission interface after the transmission of the first data has been completed comprise:
    receiving the transmission request for the second data in the storage element from the second data transmission interface by an operating system executed by the control module;
    reconnecting to the second data transmission interface by the control interface after the transmission of the first data has been completed so as to enable the second electronic device to access the transmitted first data via the second data transmission interface; and
    transmitting the second data between the second electronic device and the storage element by the operating system.

9. The control method of the storage apparatus in claim 1, wherein while the control module is transmitting data via one of the first data transmission interface and the second data transmission interface, the control interface locks a semaphore of the control module to prohibit the control module from transmitting the data via the other one of the first data transmission interface and the second data transmission interface.

10. The control method of the storage apparatus in claim 1, wherein after the control module establishes the data connections with the first electronic device and the second electronic device via the first data transmission interface and the second data transmission interface respectively, the method further comprises:
    transmitting a third data in the storage element to the first data transmission interface or the second data transmission interface, and storing data of the third data modified by the first data transmission interface or the second data transmission interface in a temporary storage area by the control module when receiving an open request for the third data from the first data transmission interface or the second data transmission interface; and
    writing the third data stored in the temporary storage area to the storage element by the control module when receiving a storage request for the third data from the first data transmission interface or the second data transmission interface.

11. The control method of the storage apparatus in claim 1, wherein after the control module establishes the data connections with the first electronic device and the second electronic device via the first data transmission interface and the second data transmission interface respectively, the method further comprises:

transmitting a third data in the storage element to the first data transmission interface and the second transmission interface, and respectively storing the third data modified by the first data transmission interface and the second data transmission interface in a temporary storage area by the control module when receiving open requests for the third data from the first data transmission interface and the second data transmission interface; and writing the third data stored in the temporary storage area to the storage element according to a receiving order of storage requests for the third data from the first data transmission interface and the second data transmission interface by the control module when receiving the storage requests, wherein the third data corresponding to a latter received storage request overwrites the third data corresponding to a former received storage request.

12. The control method of the storage apparatus in claim 1, wherein the first data transmission interface and the second data transmission interface are two wired data transmission interfaces, two wireless data transmission interfaces, or one data transmission interface and one wireless data transmission interface.

13. The control method of the storage apparatus in claim 12, wherein the wired data transmission interfaces comprise a universal serial bus (USB) interface, a FireWire interface, or a Thunderbolt interface.

14. The control method of the storage apparatus in claim 12, wherein the wireless data transmission interfaces comprise a Wireless Fidelity (Wi-Fi) interface, a Global System for Mobile Communication (GSM) interface, a Personal Handy-phone System (PHS) interface, a Code Division Multiple Access (CDMA) interface, a Worldwide Interoperability for Microwave Access (WiMAX) interface, or a Bluetooth interface.

15. The control method of the storage apparatus in claim 1, wherein the first data transmission interface is configured to perform data transmission with the storage element directly, and the second data transmission interface is configured to perform data transmission with the storage element via the control interface.

16. The control method of the storage apparatus in claim 1, in the process of transmitting the second data between the second electronic device and the storage element via the second data transmission interface by the control module, when the control module receives the transmission request for the first data in the storage element from the first data transmission interface, reconnecting the first data transmission interface by the control interface and thereafter providing the first data transmission interface for transmitting the first data by the control module after transmission of the second data is completed.

* * * * *